Jan. 26, 1960

H. RUPP 2,922,943

ELECTRICAL MACHINE

Filed June 12, 1958

INVENTOR
Hermann Rupp

BY Scrivener and Parker

ATTORNEYS

United States Patent Office

2,922,943
Patented Jan. 26, 1960

2,922,943

ELECTRICAL MACHINE

Hermann Rupp, St. Louis, Mo., assignor of one-third to Carl F. Huffman, Jr., Maplewood, and one-third to Donald A. Gemming, St. Louis, Mo.

Application June 12, 1958, Serial No. 741,489

4 Claims. (Cl. 318—254)

This invention relates broadly to the field of electrical apparatus and machinery and, more particularly, to electrical machines for producing rotative motive power, such as motors.

It has been a principal object of the invention to provide an electrical machine which is operative solely by forces of magnetic attraction and repulsion created between the rotor and stator of the machine, without the creation of counter-electromotive forces during operation. It has been another principal object of the invention to provide an electric machine which is operated by alternating current supplied by an oscillating tank circuit but the prime motive power of which is direct current which is supplied to the tank circuit as pulses. It is a further object of the invention to provide an electrical machine of the described type including means for adjusting the duration of the direct current pulses to vary the power and speed of rotation of the machine. A further principal object of the invention has been to provide an electrical machine of the described type which is operated by the oscillation of a tank circuit, which oscillation is maintained by pulses of direct current, and the operation of the machine itself is utilized to maintain the excitation of the stator magnets in order to cause the continued attraction and repulsion between the stator and rotor which produces rotation of the rotor.

The invention provides an electric machine having a fixed stator and a rotatable rotor, the stator having an annular series of series-connected electromagnets of alternately opposite polarity, and the rotor having an annular series of permanent magnets of alternately opposite polarity. A source of direct current is provided, together with means for producing pulses of direct current from the steady direct current provided by the source. These pulses are supplied to an oscillating tank circuit which includes the series-wound stator pole windings and a condenser which is connected in series with the stator pole windings, which oscillating tank circuit is charged by the charging direct current pulse at the beginning of each first half-cycle of operation of the machine. During the first half-cycle of operation each current pulse supplied by the prime power source to the stator pole windings excites the stator windings to produce a field causing attraction between the stator and rotor magnets, while during the second half-cycle the tank circuit condenser discharges to the windings of the stator pole magnets, again producing a field causing attraction between the poles of the stator and rotor magnets. At the end of each half-cycle of operation of the machine the polarity of the stator magnets is reversed and, as this occurs as the stator and rotor poles are opposite each other, repulsive forces are produced between the stator and rotor. The attractive and repulsive forces between the stator and rotor are due to the fact that the polarity of the rotor magnets does not change, while the polarity of the stator magnets changes as the stator pole piece windings are alternately excited during the positive and negative half-cycles of operation of the machine, caused by oscillation of the tank circuit.

An electrical machine according to the invention is described in the following specification and illustrated in the accompanying drawings, in which.

Figure 1:
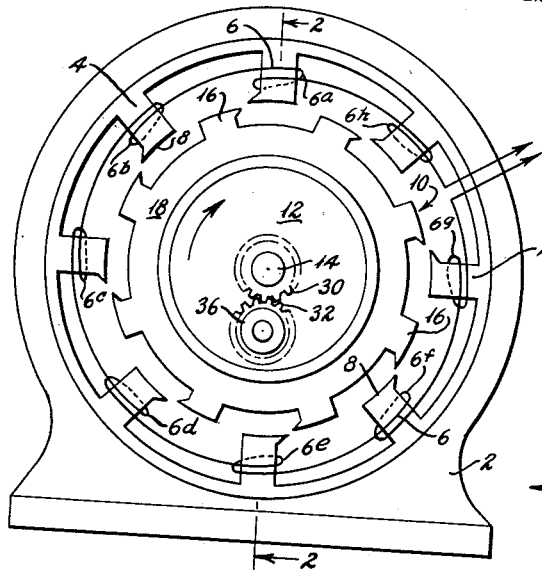
Fig. 1 is a front elevational view of an electrical machine according to the invention, showing part of the means for supplying electric energy.
Figure 3:
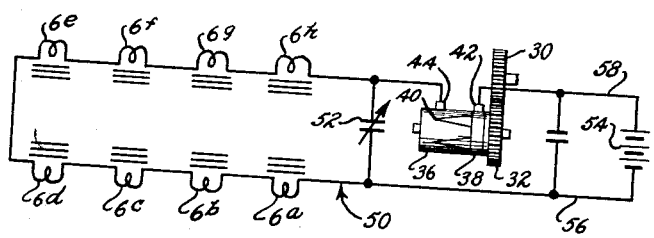
Fig. 3 is a circuit diagram of the electrical system of the machine of Fig. 1.

An embodiment of an electric machine according to the invention is disclosed in the drawings and comprises a supporting frame 2 on which there is mounted an annular series of fixed, radially inwardly extending, equally spaced pole pieces 4. Eight of these are provided in the machine which is disclosed but it will be understood that a greater or less number may be provided. These pole pieces form the cores of eight electromagnets and each of them is therefore provided with a winding 6, all of which windings 6a to 6h are connected in series as shown in Figs. 1 and 3. The outer face 8 of each stator pole piece 4 is elongated in the direction opposite to the direction of rotation of the rotor of the machine. The pole pieces 4, and if desired the whole stator assembly, is preferably formed of laminations of magnetic material.

The rotatable assembly of the machine comprises the rotor 10 which consists of a central disc 12 mounted on a rotatable shaft 14 and having at its outer periphery an annular series of equally spaced, radially outwardly extending pole pieces 16, the outer faces of which travel in a path closely adjacent the outer faces 8 of the pole pieces 4 of the stator. The central mounting disc 12 of the rotor is formed of non-magnetic material in order to insulate from ground the magnetic circuit of the machine which includes the pole pieces of the rotor and stator. The pole pieces 16 of the rotor and the annular member 18 of which they form a part are permanent magnets and are preferably of laminated construction. In the disclosed embodiment of the invention eight rotor poles are disclosed but this number may be varied with the number of stator poles, it being necessary only that the rotor and stator have the same number of poles. The outer face of each rotor pole piece 16 is elongated in the direction of rotation of the rotor, as shown in the drawings to co-operate with the corresponding, but oppositely directed, elongation of the stator pole pieces.

Figure 2:
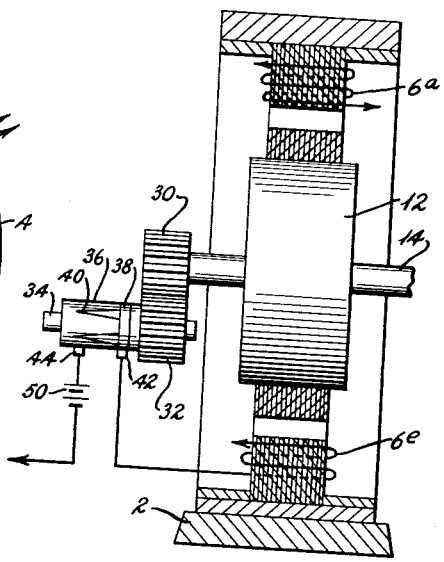
Fig. 2 is a view taken on line 2—2 of Fig. 1, also showing part of the means for supplying electric energy to the machine.

The rotor shaft 14 is provided with a gear 30 which meshes with a gear 32 mounted on shaft 34 on which there is also mounted a drum 36. The gears 30 and 32 may have any ratio necessary to provide a desired speed of rotation of drum 36. The drum 36 is formed of electrically insulating material and has embedded in its peripheral surface adjacent its one end a circumferential ring 38 formed of electrically conductive material from which there extends an annular series of circumferentially spaced, axially elongated bars 40 each of which is formed of electrically conductive material and is so shaped that it tapers downwardly in width from its one end at the ring 38 to its other end. The outer surfaces of the bars 40 are flush with the outer surface of the drum 36. Two spaced, electrically conductive brushes 42, 44 are provided, one of which, 42 is in contact with the ring 38 and the other of which, 44, is in contact with the surface of the drum 36 at the end thereof removed from ring 38 and is therefore also in contact with the smaller ends of the tapered bars 40. These brushes are spaced axially of the drum and are mounted for movement toward and away from each other and the brush 44 is mounted for movement circumferentially of the drum. In their most axially extended position, which is illustrated in Fig. 2, the brushes are so positioned that they engage the ring 38 and the periphery of the drum at the ends of the tapering bars 40 most removed from the ring.

Means are provided by the invention for supplying alternating electrical energy to the windings 6 of the stator electromagnets. These means comprise an oscillating tank circuit 50 consisting of the series-connected stator windings 6a to 6h and a variable condenser 52 connected in series with the stator windings. A source of direct current 54 is provided and its terminals are connected across the tank circuit 50 by leads 56, 58, one of which, leads 58, being broken and having its two parts connected to the brushes 42, 44. The condenser 52 and the series-connected windings 6a to 6h of the stator electromagnets form an oscillating tank circuit, the inductance-capacitance ratio of which is high to provide more efficient tank circuit operation.

Figure 4:
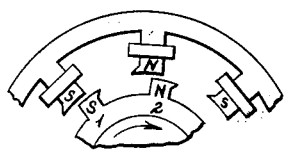
Figs. 4, 5 and 6 are partial views of the stator and rotor of the machine of Fig. 1, showing successive positions of the rotor magnet poles with respect to those of the stator.
Figure 5:
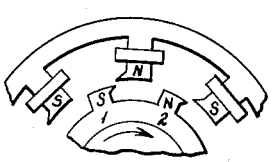
Figure 6:
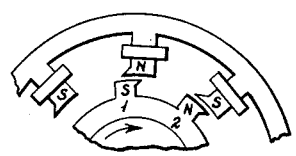
Figure 7:
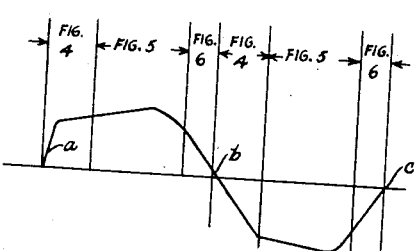
Fig. 7 illustrates graphically the flow of current in the stator pole windings.

In the operation of the electrical machine which is provided by the invention, and which is described above and illustrated in the drawings, the rotor is first given rotary motion by an auxiliary starting device as the machine provided by the invention is not self-starting. Assuming the source of direct current to be connected to the other parts of the circuit as described above, and assuming further that the rotor pieces 16 occupy the positions with respect to the stator pole pieces which are shown in Fig. 4, in which the trailing half of each rotor pole face overlaps half of a stator pole face in the direction of rotation of the rotor, direct current from the source 54 will flow through lead 58 and brushes 42, 44 to the oscillating tank circuit 50, energizing the series-connected stator pole windings and charging the condenser 52. This supply of current to the tank circuit will continue only so long as the brushes 42, 44 are electrically connected to each other the ring 38 and one of the tapered bars 40 of the drum 36. With the rotation of the drum the tapered bar 40 of drum 36 which connects the brushes will pass out of contact with them, thereby disconnecting the prime source of power 54 from the tank circuit 50. It will be seen, therefore, that only a pulse of direct current will be provided by the source 54 to the tank circuit. This pulse is represented by the sharply increasing part $a$ of the sine curve shown in Fig. 7, which curve represents the flow of current in the stator pole windings. This initial pulse $a$ provides the power for the first half-cycle of tank circuit operation and lasts only for a very short time, which is dependent upon the position of the brush 44 with respect to brush 42. After this first power pulse is shut off by disconnection of the brushes the magnetic fields established by the power pulse at the stator poles will collapse and a voltage will therefore be generated which produces a field having the same direction as the first initiating power pulse, as is established by Lenz's law. This self-induced electromagnetic energy will maintain excitation of the stator pole windings and will also recharge the condenser 58. The magnetic excitation of the stator poles during the first half-cycle of operation of the machine reaches zero when the stator and rotor core faces have reached approximate alignment, but this zero point of magnetic excitation will last for only a few degrees of rotor movement and the rotor positions at the beginning and end of this zero point are those shown in Figs. 4 and 6.

The first, or positive, half-cycle of operation of the machine is started by the single pulse of current supplied by the prime power supply 54 and during this half-cycle the stator pole windings 6 develop an electromagnetic field, which is further maintained by the self-inductance of the stator windings as the magnetic fields of the stator windings collapse, and which attracts the rotor poles, causing movement of the rotor, at the same time charging the condenser 52. The end of the positive half-cycle of operation is indicated at the point $b$ in the graph of Fig. 7 and occurs when the rotor and stator poles are approximately opposite each other. Upon completion of the positive half-cycle of operation the negative half-cycle of operation takes place, during which excitation of the stator magnets is caused by the discharge of condenser 52. The polarity of the stator magnets is reversed during the negative half-cycle with respect to their polarity during the positive half-cycle, while the polarity of the stator magnets is the same as the polarity of the rotor magnets as the stator and rotor poles pass each other. Forces of repulsion are produced between the stator and rotor poles as the stator and rotor poles pass each other and these momentary repulsive forces will be present at the beginning of each positive and negative half-cycle after the motor is in operation. The repulsive forces will assist the rotary movement of the rotor and will also permit the rotor poles to pass the stator poles without stopping or reducing speed, which would occur if the attractive forces continued. When the rotor has passed the point at which the repulsive forces exist, the polarities of the stator and rotor poles again become unlike and the magnetic forces change from repulsion to attraction and will remain so until the zero point of magnetic excitation is again reached, which is the point represented at $c$ in Fig. 7. This completes one full electrical cycle of the motor.

It will be seen that each full electrical cycle of the motor begins with an initiating pulse of current which starts the function and operation of the tank circuit, which includes the inductances of the stator pole windings and the capacitance of the condenser 52. The polarity of the rotor magnets remains the same for all conditions and these may therefore be made as permanent magnets.

The amount of power used by the machine depends on the efficiency of the tank circuit operation and on the tank circuit impedance. There are no conductors cutting lines of magnetic force to produce a generator effect or counter electro-motive force. However, the machine may be used as a generator by taking electric energy direct or by coupling from the tank circuit, and may also be used to convert direct current into alternating current.

While I have described and illustrated one embodiment of my invention, it will be apparent to those skilled in the art that other embodiments, as well as modifications of those disclosed, may be made and practiced without departing in any way from the spirit or scope of the invention, for the limits of which reference must be made to the appended claims.

What is claimed is:

1. An electric machine comprising a stator having a circular series of equally spaced, radially inwardly facing poles formed of magnetic material, a winding for each of said stator poles all of which are connected in series, a rotor mounted for rotation within the stator and having a circular series of radially outwardly extending poles formed of magnetic material, a source of direct current, a condenser connected in parallel with said series-connected stator windings to form a tank circuit, and means for supplying pulses of direct current from said source to the tank circuit.

2. An electric machine comprising a stator having a circular series of equally spaced, radially inwardly extending poles formed of magnetic material, a rotor mounted for rotation within the stator and having a circular series of equally spaced, radially outwardly extending pole pieces formed of magnetic material and being equal in number to the stator pole pieces, a winding for each of said stator pole pieces, all of the stator pole piece windings being connected in series, a condenser connected in parallel to said series-connected stator pole piece windings to form a tank circuit, a source of direct current, means for producing pulses of direct current from current supplied by said source, and means for supplying the pulses of direct current to the tank circuit consisting of said stator pole piece winding and said condenser.

3. An electric machine according to claim 2 in which the means for producing pulses of direct current from current supplied by the source comprises a rotatably mounted drum formed of electrically insulating material having a plurality of circumferentially spaced, axially extending electrically conductive members embedded in the peripheral surface thereof, two axially spaced brushes engaging the peripheral surface of the drum, one of said brushes being connected to one terminal of the source of direct current and the second brush being connected to one terminal of said tank circuit, the second terminal of said source of direct current being connected to the second terminal of said tank circuit, and means for rotating said drum at a speed equal to the speed of rotation of the rotor.

4. An electric machine according to claim 3, in which the electrically conducted members embedded in the surface of the drum taper in width axially of the drum, and means for adjusting the spacing of the brushes with respect to each other axially of the drum.

References Cited in the file of this patent

UNITED STATES PATENTS

| | | |
|---|---|---|
| 928,214 | Perkins | July 13, 1909 |
| 2,864,983 | Crafts et al. | Dec. 16, 1956 |